(12) United States Patent
Serada et al.

(10) Patent No.: US 11,242,091 B2
(45) Date of Patent: Feb. 8, 2022

(54) VEHICLE BODY FRONT STRUCTURE

(71) Applicant: SUBARU CORPORATION, Tokyo (JP)

(72) Inventors: Jun Serada, Tokyo (JP); Shoichiro Nakanishi, Tokyo (JP); Yoshio Wada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/998,119

(22) Filed: Aug. 20, 2020

(65) Prior Publication Data

US 2021/0086835 A1 Mar. 25, 2021

(30) Foreign Application Priority Data

Sep. 25, 2019 (JP) .............................. JP2019-174808
Mar. 23, 2020 (JP) .............................. JP2020-051927

(51) Int. Cl.
*B62D 21/15* (2006.01)
*B62D 21/11* (2006.01)
*B62D 25/08* (2006.01)

(52) U.S. Cl.
CPC ............ *B62D 21/155* (2013.01); *B62D 21/11* (2013.01); *B62D 25/082* (2013.01)

(58) Field of Classification Search
CPC ..... B62D 21/155; B62D 21/11; B62D 25/082

USPC .................................................... 296/187.09
See application file for complete search history.

(56) References Cited

U.S. PATENT DOCUMENTS

2018/0265135 A1* 9/2018 Komiya ................. B62D 21/06
2019/0039652 A1* 2/2019 Kamei ................. B62D 25/081

FOREIGN PATENT DOCUMENTS

JP           2008018778 A   *  1/2008
JP           2014-144714 A     8/2014

* cited by examiner

*Primary Examiner* — Pinel E Romain
(74) *Attorney, Agent, or Firm* — Troutman Pepper Hamilton Sanders LLP

(57) ABSTRACT

A vehicle body front structure includes a pair of side frames, a bumper beam, a pair of sub-frames, and a lower beam. The side frames extend substantially in a front-rear direction. The side frames are provided in a vehicle width direction. The bumper beam couples front end portions of the side frames to each other. The bumper beam extends substantially in the vehicle width direction. The sub-frames are disposed below the respective side frames. The sub-frames extend substantially in the front-rear direction. The sub-frames are provided in the vehicle width direction. The lower beam is disposed below the bumper beam. The lower beam couples end portions of the sub-frames to each other. The lower beam extends substantially in the vehicle width direction. The lower beam extends outwardly in the vehicle width direction beyond first coupling portions between the lower beam and the sub-frames.

14 Claims, 4 Drawing Sheets

VEHICLE BODY FRONT STRUCTURE

CROSS-REFERENCE TO RELATED APPLICATIONS

The present application claims priority from Japanese Patent Application No. 2019-174808 filed on Sep. 25, 2019 and Japanese Patent Application No. 2020-051927 filed on Mar. 23, 2020, the entire contents of which are hereby incorporated by reference.

BACKGROUND

The disclosure relates to a vehicle body front structure in which a pair of side frames extending substantially in a front-rear direction and provided in a vehicle width direction are coupled to each other by a bumper beam extending substantially in the vehicle width direction, on a front end side of a vehicle body.

A vehicle body front structure for a vehicle is proposed that includes: a pair of front side members that extend substantially in a front-rear direction and are provided in a vehicle width direction; a front bumper reinforcement that couples front ends of the front side members and extends substantially in the vehicle width direction; a pair of second members that are disposed below the respective front side members, extend substantially in the front-rear direction, and are provided in the vehicle width direction; and a coupling member that couples front ends of the respective second members and extends substantially in the vehicle width direction (Japanese Unexamined Patent Application Publication (JP-A) No. 2014-144714). In the vehicle body front structure described in JP-A No. 2014-144714, a curved portion is provided at a front end portion of each of the second members in a vehicle plan view. The curved portion is inclined outward in the vehicle width direction from a rear side thereof toward a front end portion in the front-rear direction of the vehicle. In a frontal offset collision of the vehicle, the front end portion of the second member buckles inward in the vehicle width direction from the curved portion serving as starting point. Accordingly, the buckled portion of the front end portion of the second member comes into contact with a side of a drive train, and a lateral force can be generated in the vehicle.

SUMMARY

An aspect of the disclosure provides a vehicle body front structure. The structure includes a pair of side frames, a bumper beam, a pair of sub-frames, and a lower beam. The side frames extend substantially in a front-rear direction. The side frames and are provided in a vehicle width direction. The bumper beam couples front end portions of the side frames to each other. The bumper beam extends substantially in the vehicle width direction. The sub-frames are disposed below the respective side frames. The sub-frames extend substantially in the front-rear direction. The sub-frames are provided in the vehicle width direction. The lower beam is disposed below the bumper beam. The lower beam couples end portions of the sub-frames to each other. The lower beam extends substantially in the vehicle width direction. The lower beam extends outwardly in the vehicle width direction beyond first coupling portions between the lower beam and the sub-frames.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the vehicle body front structure described in JP-A No. 2014-144714, the coupling member is not formed on the outer side of the second member, which is a sub-frame, in the vehicle width direction. In a vehicle collision, a reactive force against a collision object is not generated outside the sub-frame in the vehicle width direction.

It is desirable to provide a vehicle body front structure that can generate a reactive force against a collision object even outside a sub-frame in a vehicle width direction in a vehicle collision.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
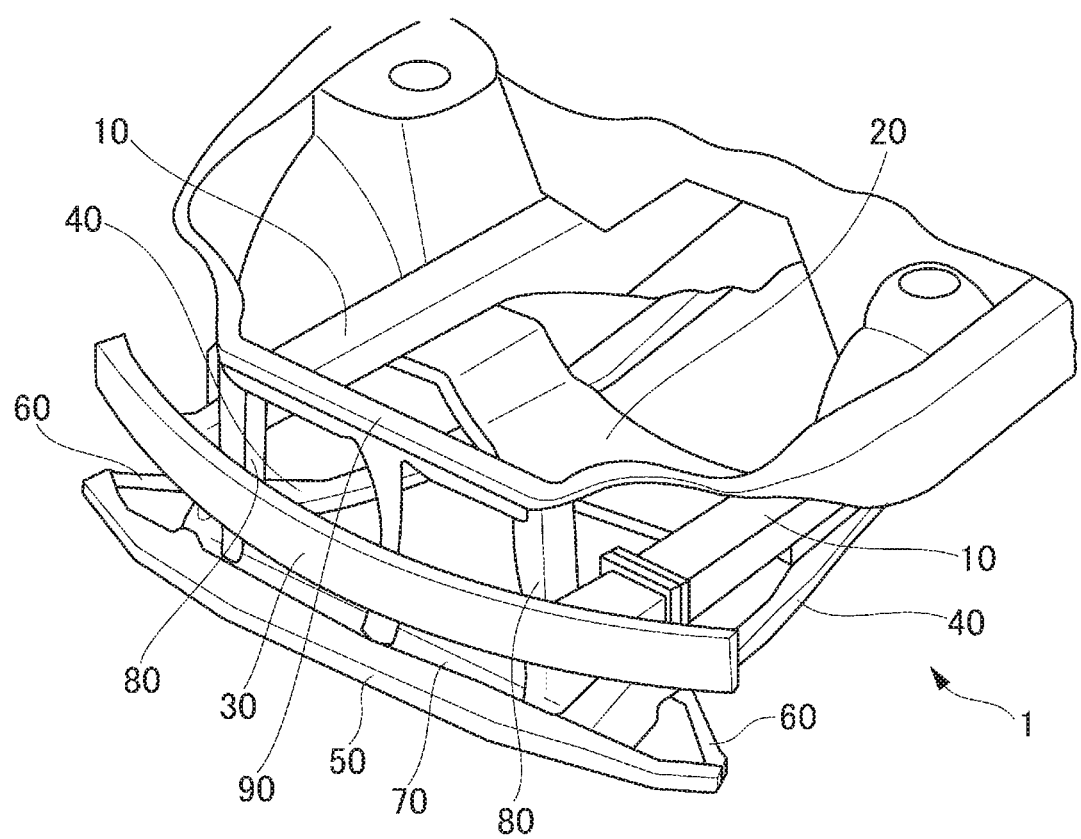
FIG. 1 is a schematic perspective view illustrating a vehicle body front structure according to an embodiment of the disclosure.
Figure 2:
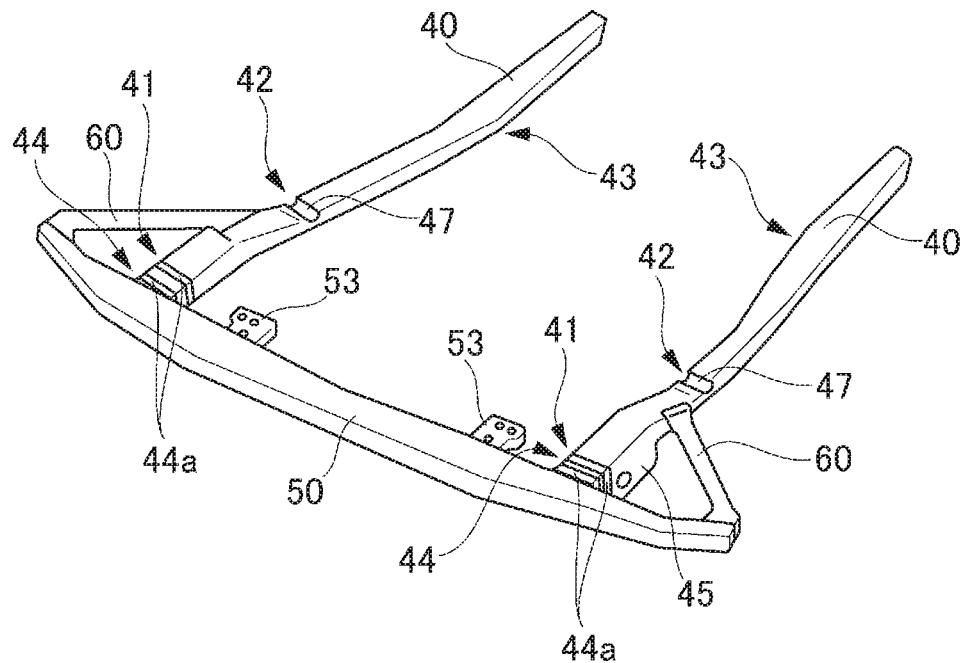
FIG. 2 is a schematic perspective view illustrating sub-frames and a lower beam.
Figure 3:
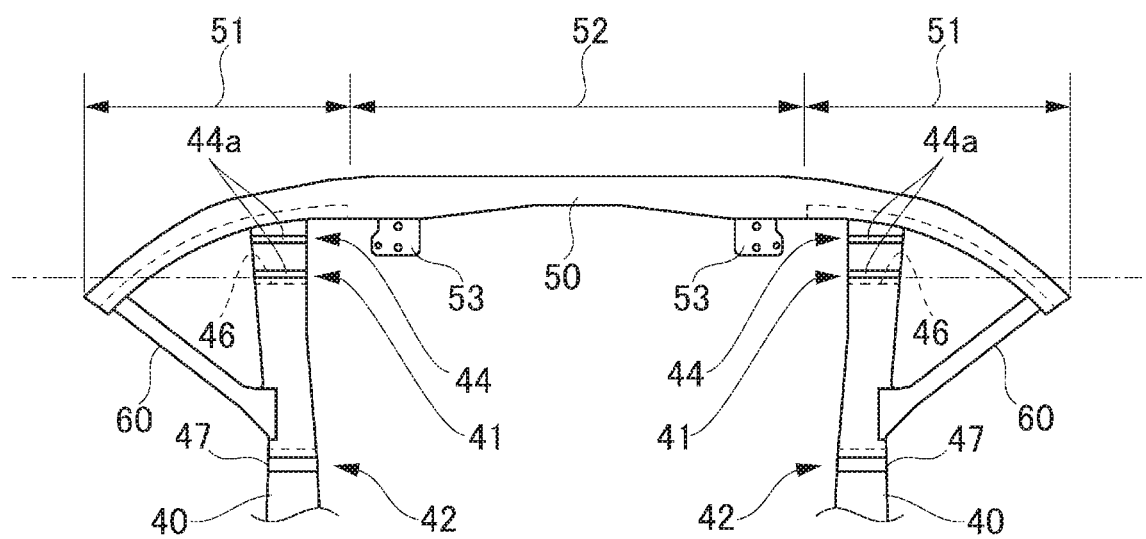
FIG. 3 is a schematic partial plan view illustrating the sub-frames and the lower beam.
Figure 4:
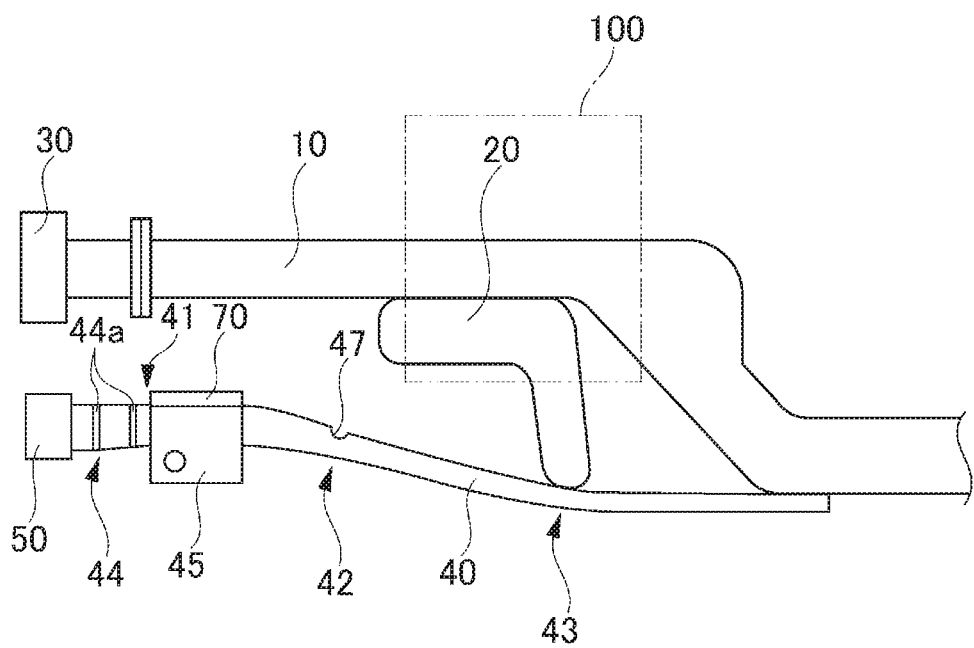
FIG. 4 is a schematic side view illustrating the vehicle body front structure.
Figure 5:
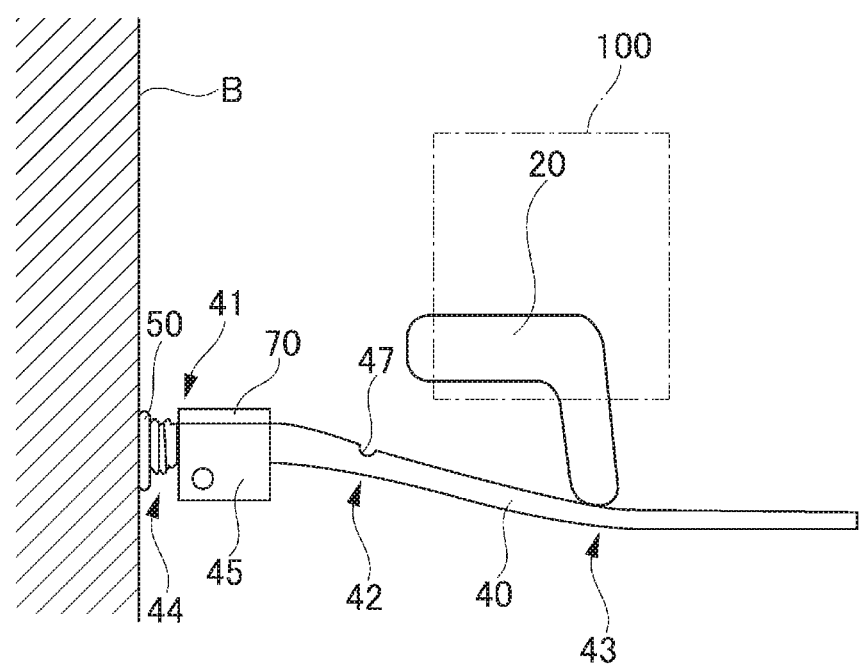
FIG. 5 is a view illustrating a state where a front end of the sub-frame is deformed in a vehicle collision.
Figure 6:
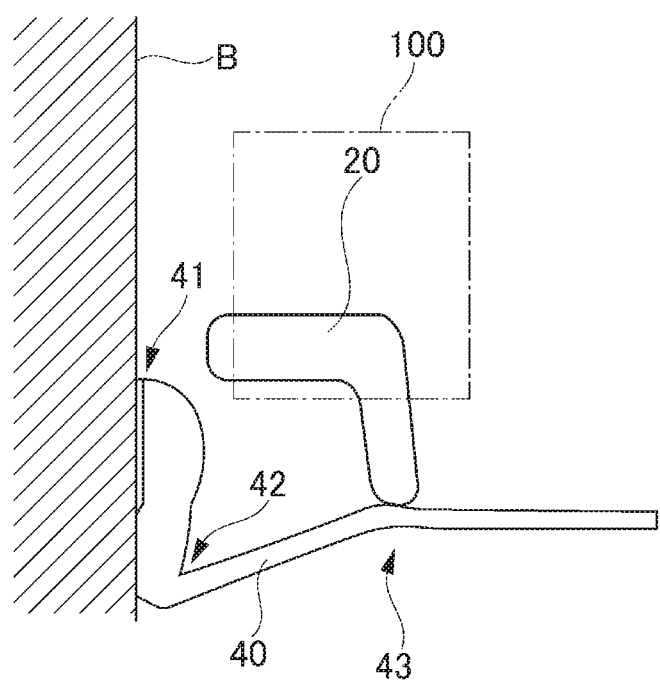
FIG. 6 is a view illustrating a state where the sub-frame is bent in the vehicle collision.

FIGS. 1 to 6 illustrate an embodiment of the disclosure. FIG. 1 is a schematic perspective view illustrating a vehicle body front structure. FIG. 2 is a schematic perspective view illustrating sub-frames and a lower beam. FIG. 3 is a schematic partial plan view illustrating the sub-frames and the lower beam. FIG. 4 is a schematic side view illustrating the vehicle body front structure. FIG. 5 is a view illustrating a state where a front end of the sub-frame is deformed in a vehicle collision. FIG. 6 is a view illustrating a state where the sub-frame is bent in the vehicle collision.

As illustrated in FIG. 1, a vehicle body 1 is formed by, for example, assembling panel-shaped members obtained by press-molding steel plates and joining the members by spot welding or the like. The vehicle body 1 includes a pair of side frames 10, a cross member 20, a bumper beam 30, a pair of sub-frames 40, a lower beam 50, and coupling members 60. The side frames 10 extend substantially in a front-rear direction on a vehicle front side. The side frames 10 are provided in a vehicle width direction. The cross member 20 is coupled to a lower portion of each side frame 10. The cross member 20 extends substantially in the vehicle width direction. The bumper beam 30 are coupled to front end portions of the side frames 10. The bumper beam 30 extends substantially in the vehicle width direction. Each sub-frame 40 is disposed below a respective one of the side frames 10. The sub-frames 40 extend substantially in the front-rear direction. The sub-frames 40 are provided in the vehicle width direction. The lower beam 50 couples front end portions of the respective sub-frames 40 to each other. The lower beam 50 extends substantially in the vehicle width direction. The coupling members 60 couple predetermined portions of the respective sub-frames 40 to end portions of the lower beam 50 in the vehicle width direction. The vehicle body 1 further includes a radiator lower support 70, a pair of radiator panels 80, and a radiator upper support 90. The radiator lower support 70 couples the front end portions of the respective side frames 10 to each other. The radiator lower support 70 extends substantially in the vehicle width direction. The radiator panels 80 extend substantially upward from both end portions of the radiator lower support 70. The radiator panels 80 are provided in the vehicle width direction. The radiator upper support 90 couples upper ends of the radiator panels 80 to each other. The radiator upper support 90 extends substantially in the vehicle width direction. The bumper beam 30 and the lower beam 50 are disposed in front of the radiator panels 80. The bumper beam 30 and the lower beam 50 at least partially overlap each other in the plan view. A power unit is mounted on the cross member 20 via a mount or the like. An arm of a suspension is mounted on the sub-frame 40 via a bush, a bracket, or the like.

As illustrated in FIG. 2, the lower beam 50 is formed such that each end portion of the lower beam 50 in the vehicle width direction projects outward in the vehicle width direction from a respective one of coupling portions between the lower beam 50 and the sub-frames 40. In one embodiment, the coupling portion between the lower beam 50 and the sub-frame 40 may serve as a "first coupling portion". As illustrated in FIG. 3, the lower beam 50 extends substantially in the vehicle width direction between the coupling portions between the respective sub-frames 40 and the lower beam 50. The lower beam 50 extends rearward in an inclined manner in regions outside the coupling portions between the lower beam 50 and the respective sub-frames 40 in the vehicle width direction. In the present embodiment, the lower beam 50 includes outer sections 51 and an inner section 52. The outer sections 51 are located outside the inner section 52 in the vehicle width direction. Each outer section 51 contains a respective one of the coupling portions between the lower beam 50 and the sub-frames 40. The outer sections 51 form closed cross sections in a side view. The inner section 52 is located on inner sides of the outer sections 51. The inner section 52 forms an open cross section in the side view. The lower beam 50 includes brackets 53 on a center side in the vehicle width direction. The brackets 53 are coupled to the radiator lower support 70. The brackets 53 project rearward.

As illustrated in FIG. 4, a front end of each sub-frame 40 is coupled to the lower beam 50. A partial section of each sub-frame 40 is inclined downward and rearward. Each sub-frame 40 extends substantially horizontally rearward as a whole. FIG. 4 is a schematic view illustrating a positional relationship among the side frame, the sub-frame, and the like. Some of the members are omitted in FIG. 4, and the illustrated members are partially simplified. In the present embodiment, the sub-frame 40 forms a closed cross section across the front and rear. An upper surface of each sub-frame 40 is coupled to the radiator lower support 70 by spot welding at a portion between (i) the coupling portion between the lower beam 50 to the sub-frame 40 and (ii) a coupling portion between the sub-frame 40 and the coupling member 60. In one embodiment, the coupling portion between the sub-frame 40 and the coupling member 60 may serve as a "second coupling portion". A rear end portion of each sub-frame 40 is coupled to the side frame 10. A center portion of each sub-frame 40 in the front-rear direction is coupled to the cross member 20.

Each sub-frame 40 includes a first buckling portion 41, a second buckling portion 42, and a third buckling portion 43. The first buckling portion 41 is provided between (i) the coupling portion between the lower beam 50 and the sub-frame 40 and (ii) the coupling portion between the sub-frame 40 and the coupling member 60. The second buckling portion 42 is provided in rear of the coupling portion between the sub-frame 40 and the coupling member 60. The third buckling portion 43 is provided in rear of the second buckling portion 42. When a collision load is applied to the sub-frame 40 from the front, the sub-frame 40 is bent into an upward convex shape at the first buckling portion 41, is bent into a downward convex shape at the second buckling portion 42, and is bent into the upward convex shape at the third buckling portion 43. A front end portion of each sub-frame 40 forms a crash box 44 that collapses in a vehicle collision. In the present embodiment, the crash box 44 includes beads 44a. The first buckling portion 41 is disposed in rear of the crash box 44.

In the present embodiment, each sub-frame 40 includes a towing hook 45 between (i) the coupling portion between the lower beam 50 and the sub-frame 40 and (ii) the coupling portion between the sub-frame 40 and the coupling member 60. The rigidity of each sub-frame 40 changes in the front-rear direction at a front end of the towing hook 45. The front end of the towing hook 45 forms the first buckling portion 41. As illustrated in FIG. 3, in the present embodiment, a reinforcing plate 46 is provided inside the closed cross section of each sub-frame 40 so as to correspond to the towing hook 45. A front end of the reinforcing plate 46 also forms the first buckling portion 41. The reinforcing plate 46 is provided across a portion between the first buckling portion 41 and the second buckling portion 42 of each sub-frame 40. In one embodiment, the reinforcing plate 46 may serve as a "reinforcing member". The rigidity of each sub-frame 40 changes in the front-rear direction at the front end of the towing hook 45 and/or the reinforcing plate 46. When an impact substantially in the front-rear direction of the vehicle is input to each sub-frame 40, a stress concentrates on the first buckling portion 41 which is the rigidity changing point, and the first buckling portion 41 serves as a bent portion that is easily bent.

In the present embodiment, each sub-frame 40 includes a bead 47 in rear of the coupling portion between the sub-frame 40 and the coupling member 60. The bead 47 is formed on an upper surface of the sub-frame 40 in a downward convex shape. The bead 47 extends in the vehicle width direction. A portion of each sub-frame 40 where the bead 47 is formed is more fragile than portions in front of and in rear of the bead 47. The bead 47 forms the second buckling portion 42. In the present embodiment, the rigidity of each sub-frame 40 changes in the front-rear direction at a rear end of the reinforcing plate 46. The rear end of the reinforcing plate 46 also forms the second buckling portion 42.

As illustrated in FIG. 4, each sub-frame 40 is coupled to the cross member 20. In the present embodiment, this coupling portion between the sub-frame 40 and the cross member 20 forms the third buckling portion 43. In one embodiment, the coupling portion between the sub-frame 40 and the cross member 20 may serve as a "third coupling portion". Each sub-frame 40 is inclined rearward and downward from the first buckling portion 41 to the third buckling portion 43. Each sub-frame 40 is coupled to the cross member 20, so that the rigidity of the coupling portion is improved. The rigidity changes in the front-rear direction between the coupling portion where the rigidity is improved and the portion in front of the coupling portion. Thus, when an impact substantially in the front-rear direction of the vehicle is input to each sub-frame 40, the stress concentrates on the third buckling portion 43 which is the rigidity changing point, and the third buckling portion 43 serves as a bent portion that is easily bent.

As illustrated in FIG. 3, the coupling member 60 extends forward from the portion between the first buckling portion 41 and the second buckling portion 42 of each sub-frame 40. The coupling member 60 is inclined outward in the vehicle width direction. The coupling member 60 is coupled to the end portion of the lower beam 50 in the vehicle width direction. In the present embodiment, the coupling member 60 is coupled to a portion that is located between the first buckling portion 41 and the second buckling portion 42 of the sub-frame 40 and that is closer to the second buckling portion 42 than the first buckling portion 41. A coupling portion between the lower beam 50 and the coupling member 60 is located in rear of a rear end of the crash box 44. In one embodiment, the coupling portion between the lower beam 50 and the coupling member 60 may serve as a "fourth coupling portion".

In the vehicle body front structure configured as described above, the bumper beam 30 and the lower beam 50 are disposed at the frontmost end of the vehicle body 1. Therefore, in the vehicle collision, a collision object B first comes into contact with the bumper beam 30 and the lower beam 50. Accordingly, a load applied to the collision object B is dispersed over a wider area than a case where the lower beam 50 is not provided. Furthermore, the lower beam 50 extends outwardly in the vehicle width direction beyond the coupling portions between the sub-frames 40 and the lower beam 50. Therefore, a reactive force can be generated against the collision object B even outside the sub-frame 40 in the vehicle width direction. Therefore, the load applied to the collision object B in the early stage of the collision does not locally increase.

As illustrated in FIG. 5, when the collision object B moves relatively rearward after coming into contact with the lower beam 50, the crash box 44 at the front end portion of each sub-frame 40 collapses in the front-rear direction. Here, the coupling portion between the lower beam 50 and the coupling member 60 is in rear of the rear end of the crash box 44. Therefore, a large load does not act on the coupling member 60 side from the collision object B when the crush box 44 collapses. In the present embodiment, the strength of the buckling portions 41, 42, and 43 is set such that the first buckling portion 41, the second buckling portion 42, and the third buckling portion 43 are not buckled by a load acting on the sub-frame 40 when the crash box 44 collapses. Accordingly, in a case of a light collision in which the crash box 44 collapses, other portions of the sub-frame 40 are not deformed, and the collision does not affect the arms of the suspension.

When the collision object B moves rearward after the crash box 44 collapses, a relatively large reactive force is generated outside the lower beam 50 in the vehicle width direction because the lower beam 50 is supported by the sub-frame 40 and the coupling member 60. In particular, in the present embodiment, the lower beam 50 has the outer sections 51 which form the closed cross sections and the inner section 52 that forms the open cross section. Therefore, a reactive force can be effectively generated on the outside in the vehicle width direction while reducing an intrusion amount of the lower beam 50 at the center portion in the vehicle width direction in rear of which a power unit 100 or the like is disposed.

When the collision object B moves further rearward, the sub-frame 40 is bent at the first buckling portion 41, the second buckling portion 42, and the third buckling portion 43 as starting points. As illustrated in FIG. 6, the first buckling portion 41 is bent into the upward convex shape, the second buckling portion 42 is bent into the downward convex shape, and the third buckling portion 43 is bent into the upward convex shape. Here, description will be made on how the buckling portions 41, 42, and 43 of the sub-frame 40 are bent.

When the collision object B moves rearward and the sub-frame 40 is compressed in the front-rear direction, the sub-frame 40 enters a buckling mode in which the sub-frame 40 is bent at three points of the first buckling portion 41, the second buckling portion 42, and the third buckling portion 43. In the present embodiment, the second buckling portion 42 includes the bead 47 on the upper surface of the sub-frame 40. The bead 47 has a downward convex shape. Therefore, the upper surface of the sub-frame 40 is bent by the compression in an axial direction, so that the sub-frame 40 is bent into the downward convex shape. Accordingly, when the collision object B moves further rearward, the sub-frame 40 enters a buckling mode in which the second buckling portion 42 is bent into the downward convex shape. With the downward bending of the second buckling portion 42, rotational moments act on the first buckling portion 41 and the third buckling portion 43 in a direction of the upwardly convex bending, and the first buckling portion 41 and the third buckling portion 43 are bent into the upward convex shape.

The partial section of the sub-frame 40 is inclined rearward and downward. Therefore, a front end of the sub-frame 40 where an impact is input deviates in an up-down direction from a rear end portion of the sub-frame 40 where a reactive force against the input is generated. Accordingly, in addition to the compression stress in the axial direction, stress is generated at the front end portion located at an upper position such that the sub-frame 40 is bent into the upward convex shape, while stress is also generated at the rear end portion located at a lower position such that the sub-frame 40 is bent into the downward convex shape. In the present embodiment, the stress is generated at the first buckling portion 41 such that the first buckling portion 41 is bent into the upward convex shape, and the stress is generated at the third buckling portion 43 such that the third buckling portion 43 is bent into the downward convex shape. As described above, although the stress is generated at the third buckling portion 43 such that the third buckling portion 43 is bent into the downward convex shape, a rotational moment in a direction of bending into the upward convex shape acts on the third buckling portion 43 along with the downward bending of the second buckling portion 42, so that the third buckling portion 43 is bent into the upward convex shape against the bending stress.

When the buckling portions 41, 42, and 43 are bent, the welding portion between the sub-frame 40 and the radiator lower support 70 is broken, and the sub-frame 40 is separated from the radiator lower support 70. In the present embodiment, positions and the number of spot welding points are set such that the sub-frame 40 is surely separated from the radiator lower support 70. When the buckling portions 41, 42, and 43 of the sub-frame 40 are bent in this manner, energy in the collision can be absorbed. Here, the first buckling portion 41 of the sub-frame 40 moves rearward together with the collision object B, and the sub-frame 40 is held by the cross member 20 at the third buckling portion 43, so that the second buckling portion 42 moves downward while being bent.

As illustrated in FIG. 6, when the sub-frame 40 is bent at the buckling portions 41, 42, and 43, the sub-frame 40 extends vertically from the first buckling portion 41 to the second buckling portion 42 and comes into contact with the collision object B in a wide range. Accordingly, after the sub-frame 40 is bent, the load applied to the collision object B can be dispersed over the wider range.

In the present embodiment, the sub-frame 40 is disposed so as not to interfere with the power unit 100 and accessories thereof when the first buckling portion 41, the second buckling portion 42, and the third buckling portion 43 are bent. For example, as illustrated in FIG. 6, when the sub-frame 40 extends vertically from the first buckling portion 41 to the second buckling portion 42, a rising portion of the sub-frame 40 is in front of the power unit 100. Therefore, the power unit 100 is not excessively pushed by the sub-frame 40 into a vehicle compartment side.

The coupling member 60 is coupled to the portion between the first buckling portion 41 and the second buckling portion 42. Therefore, when the sub-frame 40 is bent, the coupling member 60 does not affect buckling of the second buckling portion 42. In the present embodiment, the reinforcing plate 46 is provided between the first buckling portion 41 and the second buckling portion 42. Therefore, a load acting on the sub-frame 40 from the coupling member 60 can be effectively resisted.

The reinforcing plate 46 is provided between the first buckling portion 41 and the second buckling portion 42 of the sub-frame 40. Therefore, deformation between the first buckling portion 41 and the second buckling portion 42 is prevented in the collision. The reinforcing plate 46 is provided corresponding to the towing hook 45, and accurately controls a deformation mode of the sub-frame 40 without increasing the number of components.

In the above-described embodiment, the rigidity of the first buckling portion 41 of the sub-frame 40 changes due to the front ends of the towing hook 45 and the reinforcing member 46. Alternatively, either one of the towing hook 45 and the reinforcing member 46 may be provided such that the rigidity of the first buckling portion 41 changes. Further, the first buckling portion 41 may have a hole formed in the sub-frame or a fragile portion such as a bead. The configuration of the first buckling portion 41 may be optionally changed. In particular, when the first buckling portion 41 has a bead or a hole formed in a lower surface of the sub-frame 40, the first buckling portion 41 is easily bent into the upward convex shape.

The second buckling portion 42 of the sub-frame 40 includes a fragile portion implemented by the bead 47 and a rigidity changing portion implemented by the rear end of the reinforcing plate 46. Alternatively, the second buckling portion 42 may include either one of the fragile portion and the rigidity changing portion. The configuration of the second buckling portion 42 may be optionally changed. In the above-described embodiment, since the bead 47 is formed on the upper surface of the sub-frame 40, the sub-frame 40 is easily bent into the downward convex shape at the second buckling portion 42. Alternatively, when the sub-frame 40 is configured to be easily bent into the upward convex shape at the first buckling portion 41, a buckling mode in which the second buckling portion is bent into the downward convex shape is realized even if the bead 47 is omitted.

In the embodiment, the third buckling portion 43 of the sub-frame 40 is the coupling portion between the cross member 20 and the sub-frame 40. Alternatively, the third buckling portion 43 may be provided in the vicinity of the coupling portion between the cross member 20 and the sub-frame 40, or may be provided independently of the cross member 20.

In the above-described embodiment, the reinforcing member is provided across the portion from the first buckling portion 41 to the second buckling portion 42 of the sub-frame 40. Alternatively, if a sufficient strength is secured across the portion from the first buckling portion 41 to the second buckling portion 42 and a bending mode of the sub-frame 40 is not disturbed in the collision, the reinforcing member may be omitted.

In the above-described embodiment, the coupling member 60 is coupled to the end portion of the lower beam 50 in the vehicle width direction. Alternatively, if the coupling member 60 is coupled to a portion of the lower beam 50 that is located on the outside of the coupling portion between the lower beam 50 and the sub-frame 40 in the vehicle width direction, the same operation and effect as in the above-described embodiment can be obtained. That is, the coupling position of the coupling member 60 may be appropriately changed according to the collision performance that the vehicle is to have. If the collision performance that the vehicle is to have is satisfied, the coupling member 60 may be omitted.

The embodiments of the disclosure have been described above. It is noted that the embodiments described above limit neither the disclosure nor the scope of claims. Further, it is also noted that not all combinations of the features described in the embodiments are essential to a solution to the object of the disclosure.

The invention claimed is:

1. A vehicle body front structure comprising:
a pair of side frames that extend substantially in a front-rear direction, the side frames being provided in a vehicle width direction;
a bumper beam that couples front end portions of the side frames to each other, the bumper beam extending substantially in the vehicle width direction;
a pair of sub-frames disposed below the respective side frames, the sub-frames extending substantially in the front-rear direction, the sub-frames being provided in the vehicle width direction; and
a lower beam disposed below the bumper beam, the lower beam coupling end portions of the sub-frames to each other, the lower beam extending substantially in the vehicle width direction, wherein
the lower beam extends outwardly in the vehicle width direction beyond first coupling portions between the lower beam and the sub-frames.

2. The vehicle body front structure according to claim 1, further comprising:
coupling members each of which couples (i) a respective one of first portions of the lower beam that is located on an outside of a respective one of the first coupling portions in the vehicle width direction and (ii) a portion of a respective one of the sub-frames that is in rear of the respective one of the first coupling portions.

3. The vehicle body front structure according to claim 2, wherein
each sub-frame comprises
a first buckling portion provided between (i) the respective one of the first coupling portions and (ii) a respective one of second coupling portions between the sub-frames and the coupling members, each first buckling portion being configured to be bent into an upward convex shape when a collision load is applied to the respective one of the sub-frames from a front, and
a second buckling portion provided in rear of the respective one of the second coupling portions, each second buckling portion being configured to be bent into a downward convex shape when the collision load is applied to the respective one of the sub-frames from the front.

4. The vehicle body front structure according to claim 3, further comprising:
a cross member coupled to lower portions of the side frames, the cross members extending substantially in the vehicle width direction, wherein
each sub-frame further comprises a third buckling portion in rear of the second buckling portion,
each third buckling portion is configured to be bent into an upward convex shape when the collision load is applied to the respective one of the sub-frames, and
each third buckling portion is disposed (i) at a third coupling portion between the respective one of the sub-frames and the cross member or (ii) in a vicinity of the third coupling portion.

5. The vehicle body front structure according to claim 4, wherein
a power unit is mounted on the cross member, and
each sub-frame is disposed in such a manner that the sub-frame does not interfere with the power unit while the sub-frame is bent at the first buckling portion, the second buckling portion, and the third buckling portion.

6. The vehicle body front structure according to claim 3, wherein
each sub-frame comprises a crash box provided at a front end of the sub-frame,
each crash box is configured to collapse in the front-rear direction when the collision load is applied to the respective one of the sub-frames from the front, and
a fourth coupling portion between the lower beam and each coupling member is disposed in rear of a rear end of the respective one of the crash boxes in the front-rear direction.

7. The vehicle body front structure according to claim 4, wherein
each sub-frame comprises a crash box provided at a front end of the sub-frame,
each crash box is configured to collapse in the front-rear direction when the collision load is applied to the respective one of the sub-frames from the front, and
a fourth coupling portion between the lower beam and each coupling member is disposed in rear of a rear end of the respective one of the crash boxes in the front-rear direction.

8. The vehicle body front structure according to claim 5, wherein
each sub-frame comprises a crash box provided at a front end of the sub-frame,
each crash box is configured to collapse in the front-rear direction when the collision load is applied to the respective one of the sub-frames from the front, and
a fourth coupling portion between the lower beam and each coupling member is disposed in rear of a rear end of the respective one of the crash boxes in the front-rear direction.

9. The vehicle body front structure according to claim 3, wherein each sub-frame comprises a reinforcing member provided across a portion between the first buckling portion and the second buckling portion.

10. The vehicle body front structure according to claim 4, wherein each sub-frame comprises a reinforcing member provided across a portion between the first buckling portion and the second buckling portion.

11. The vehicle body front structure according to claim 5, wherein each sub-frame comprises a reinforcing member provided across a portion between the first buckling portion and the second buckling portion.

12. The vehicle body front structure according to claim 6, wherein each sub-frame comprises a reinforcing member provided across a portion between the first buckling portion and the second buckling portion.

13. The vehicle body front structure according to claim 7, wherein each sub-frame comprises a reinforcing member provided across a portion between the first buckling portion and the second buckling portion.

14. The vehicle body front structure according to claim 8, wherein each sub-frame comprises a reinforcing member provided across a portion between the first buckling portion and the second buckling portion.

* * * * *